US009160722B2

(12) United States Patent
Gavrilov

(10) Patent No.: US 9,160,722 B2
(45) Date of Patent: Oct. 13, 2015

(54) SYSTEM AND METHOD FOR SECURING USER INFORMATION ON SOCIAL NETWORKS

(75) Inventor: Dimitry Gavrilov, Mountain View, CA (US)

(73) Assignee: Anchorfree, Inc., Menlo Park, CA (US)

( * ) Notice: Subject to any disclaimer, the term of this patent is extended or adjusted under 35 U.S.C. 154(b) by 0 days.

(21) Appl. No.: 13/460,621

(22) Filed: Apr. 30, 2012

(65) Prior Publication Data

US 2013/0290716 A1 Oct. 31, 2013

(51) Int. Cl.
H04L 9/32 (2006.01)
G06F 21/00 (2013.01)
G06F 7/04 (2006.01)
G06F 17/00 (2006.01)
H04L 29/06 (2006.01)
G06F 21/31 (2013.01)

(52) U.S. Cl.
CPC ........ H04L 63/0471 (2013.01); H04L 63/0272 (2013.01); G06F 21/31 (2013.01); H04L 63/0428 (2013.01); H04L 63/08 (2013.01)

(58) Field of Classification Search
CPC . H04L 63/08; H04L 63/0428; H04L 63/0272; G06F 21/31
USPC .......... 713/168, 170, 182; 726/5, 15
See application file for complete search history.

(56) References Cited

U.S. PATENT DOCUMENTS

| 8,769,259 | B2 * | 7/2014 | Broustis et al. ............... 713/152 |
| 2007/0079368 | A1 * | 4/2007 | Takeyoshi et al. .............. 726/15 |
| 2009/0292814 | A1 * | 11/2009 | Ting et al. ...................... 709/229 |
| 2010/0332818 | A1 * | 12/2010 | Prahlad et al. ................. 713/150 |
| 2011/0047229 | A1 * | 2/2011 | Sinha et al. .................... 709/206 |
| 2011/0145571 | A1 * | 6/2011 | Schmidt-Karaca et al. .. 713/160 |
| 2012/0023332 | A1 * | 1/2012 | Gorodyansky ................ 713/168 |
| 2012/0272051 | A1 * | 10/2012 | Chittigala et al. ............. 713/150 |
| 2013/0279690 | A1 * | 10/2013 | Durham et al. ................. 380/28 |
| 2013/0305383 | A1 * | 11/2013 | Garralda et al. ................ 726/26 |

* cited by examiner

Primary Examiner — Aravind Moorthy
(74) Attorney, Agent, or Firm — TransPacific Law Group; Pavel I. Pogodin, Esq.

(57) ABSTRACT

A computer-implemented method for securing personal information of a user on social networks. The method involves: receiving personal information from a user in an unencrypted textual form by a client computer; transmitting the received personal information via a secure virtual private network (VPN) connection to a dedicated VPN server/proxy; receiving the personal information at the dedicated VPN server/proxy; encrypting the received personal information at the dedicated VPN server/proxy using an encryption key; and transmitting the encrypted personal information from the dedicated VPN server/proxy to the social network. Other users of the social network also use the dedicated VPN server/proxy in order to decrypt (access) the personal information of the user, which has been encrypted as specified above.

17 Claims, 5 Drawing Sheets

SYSTEM AND METHOD FOR SECURING USER INFORMATION ON SOCIAL NETWORKS

BACKGROUND OF THE INVENTION

1. Field of the Invention

This invention relates in general to methods and systems for providing information security and, more particularly, to securing various items of personal information of a user, which are stored on servers associated with social networking websites or services, and preventing the unauthorized use of this information.

2. Description of the Related Art

Social networking websites are very popular for various types of online interaction between users. When a user creates a profile on the social networking website, he or she provides certain personal information that is stored on one or more servers associated with the social networking service. Unfortunately, the above-described arrangement for storing user personal data provides the social networking service with a complete control over the user's personal data, which could be compromised or used without user's permission or knowledge.

Therefore, what are needed are systems and methods for securing various items of personal information of a user, which are stored on servers associated with social networking websites or services and preventing the unauthorized use of this information.

SUMMARY OF THE INVENTION

The inventive methodology is directed to methods and systems that substantially obviate one or more of the above and other problems associated with conventional techniques for providing user security on social networks.

In accordance with one aspect of the present invention, there is provided a computer-implemented method for securing personal information of a user. The inventive method involves: receiving personal information from a user in an unencrypted textual form by a client computer; transmitting the received personal information via a secure virtual private network (VPN) connection to a dedicated VPN server/proxy; receiving the personal information at the dedicated VPN server/proxy; encrypting at least a portion of the received personal information at the dedicated VPN server/proxy using an encryption key; and transmitting the encrypted personal information from the dedicated VPN server/proxy to the social networking service.

In accordance with another aspect of the present invention, there is provided a computer-readable medium embodying a set of computer-readable instructions, which, when executed by one or more processors, cause the one or more processors perform a method for securing personal information of a user. The method involves: receiving personal information from a user in an unencrypted textual form by a client computer; transmitting the received personal information via a secure virtual private network (VPN) connection to a dedicated VPN server/proxy; receiving the personal information at the dedicated VPN server/proxy; encrypting at least a portion of the received personal information at the dedicated VPN server/proxy using an encryption key; and transmitting the encrypted personal information from the dedicated VPN server/proxy to the social networking service.

In accordance with yet another aspect of the present invention, there is provided a computerized system for securing personal information of a user, the computerized system incorporating: a client computer for receiving personal information from a user in an unencrypted textual form; and a dedicated VPN server/proxy for receiving personal information via a secure virtual private network (VPN) connection from the client computer; wherein the dedicated VPN server/proxy encrypts at least a portion of the received personal information at the using an encryption key and transmits the encrypted personal information to the social networking service.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Aspects of the present invention provide systems and methods for securing various items of personal information of a user, which are stored on servers associated with social networking websites or services.

Figure 1:
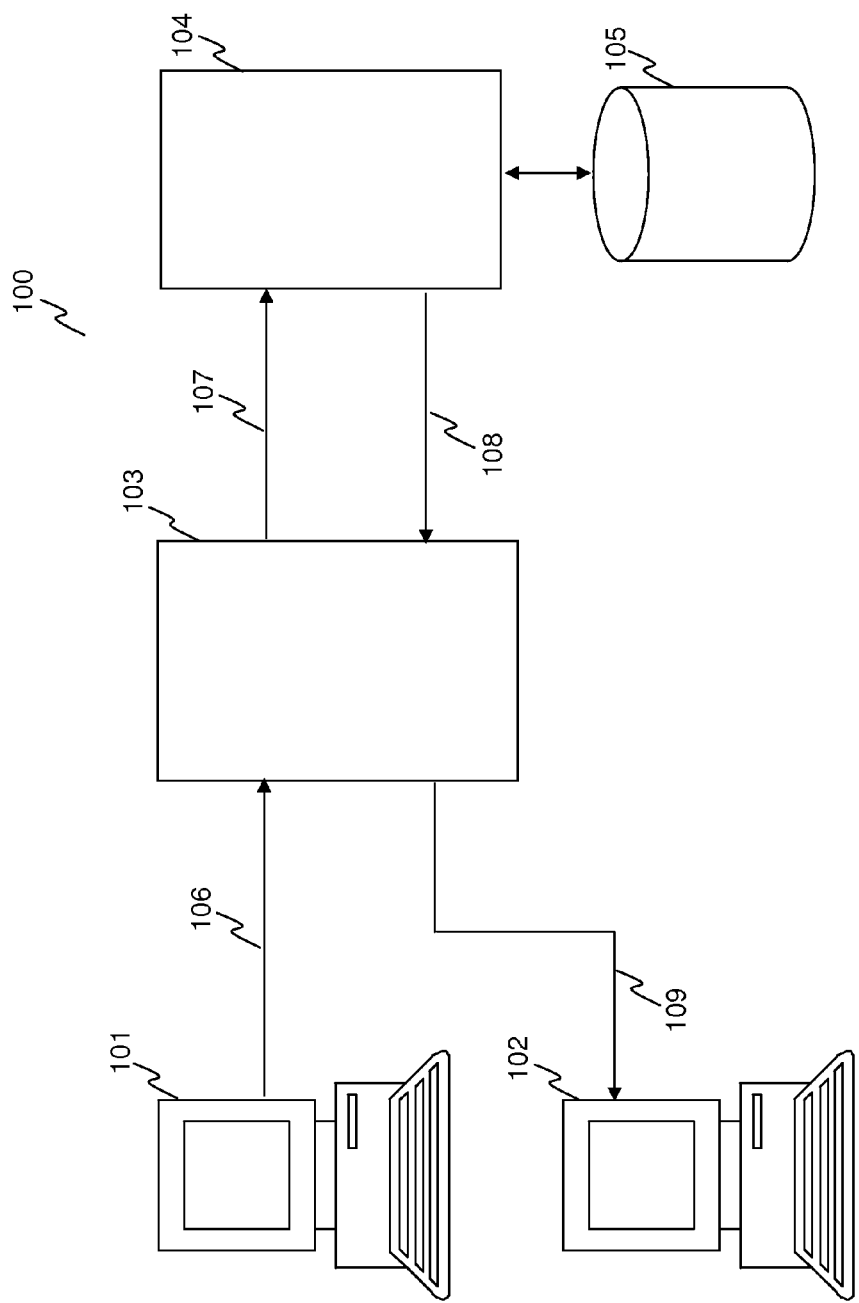
FIG. 1 illustrates an exemplary embodiment of the inventive system for protecting personal information of users of social networking services.

FIG. 1 illustrates an exemplary embodiment of the inventive system for protecting personal information of users of social networking services. In the embodiment shown in FIG. 1, the user (not shown) directly accesses the client computer 101, which could be any now known or later developed device providing network connectivity, such as desktop computer, laptop computer, mobile phone and the like. In the shown embodiment, the user computer 101 may be pre-configured with virtual private network (VPN) client software operable to provide a secure (encrypted) communication channel (tunnel) 106 between the user computer 101 and the dedicated server 103. Specifically, the VPN client software is configured to encrypt information received from the user before sending it to the dedicated server 103 and to decrypt information received from the dedicated server 103 via the secure communication channel 106 before providing this information to the user.

In one or more embodiments, the encryption method or algorithm (cipher) used by the VPN client software to encrypt information received from the user can be any now known or later developed encryption cipher, including, for example, DES, AES, RSA and the like. As would be appreciated by those of skill in the art, the inventive concepts described herein are not limited to any specific encryption cipher.

The dedicated server 103 operates as a web access proxy and enables the client 101 to access the network resources located on the Internet. In one or more embodiments, the server 103 is also a VPN server. In one or more embodiments, the dedicated server 103 receives information from the client computer 101 over the secure (encrypted) VPN channel 106. Upon the receipt, the information may be decrypted pursuant to the VPN protocol.

In one or more embodiments, the dedicated server 103 encrypts the information received from the client computer 101 before sending it on to the social networking service 104. The encrypted information may include personal (private) information of the user, including, without limitation, contact information, age, gender, home country/town, personal preferences, and the like. In one or more embodiments, the encryption of the aforesaid information may be performed by any now known or later developed encryption algorithm (cipher), including, for example, DES, AES, RSA and the like. As would be appreciated by those of skill in the art, the inventive concepts described herein are not limited to any specific encryption cipher used by the dedicated server 103 and any suitable cipher could be used to encrypt personal information of the user.

After encryption step, the encrypted personal information of the user is transmitted by the dedicated VPN server/proxy to the social networking server 104, as indicated by numeral 107 in FIG. 1. It should be noted that the inventive concepts described herein are not limited to any specific hardware or software configuration of the social networking service. This service may be implemented using the server 104 or using any other suitable combination of hardware and software. In one or more embodiments, the social networking service is implemented using cloud-based computing and storage resources.

In the embodiment shown in FIG. 1, the social networking server 104 is configured to store personal information of the user in the storage system 105. The storage system 105 may be of any now know or later developed type, including, without limitation, a relational database or any other suitable information storage configuration. After receiving the encrypted personal information of the user from the dedicated VPN server/proxy 103, the social networking server 104 is configured to store the received encrypted information in the storage system 105.

When another (second) user accessing client computer 102 makes a request for the user's personal information from the social networking server 104, the request is first sent by the client software executing on the client computer 102 to the dedicated VPN server/proxy 103, which, in turn, requests the user's information from the social networking server 104. The encrypted personal information is provided by the networking server 104 to the dedicated VPN server/proxy 103, which is configured to decrypt the received encrypted personal information of the first user. After the decryption, the personal information of the first user is sent over secure (encrypted) VPN channel to the client computer 102.

In one or more embodiments, the encryption keys used for encryption and decryption of the personal information of the first user on the dedicated VPN server/proxy 103 are pre-shared between the users. To this end, the dedicated VPN server/proxy 103 may be configured to facilitate the encryption key sharing between users.

As would be appreciated by those of skill in the art, only the users who have a user account on the dedicated VPN server/proxy 103 as well as appropriate decryption keys for decrypting the personal data of the first user will be able to view the personal data of that first user stored on the social network using the dedicated VPN server/proxy 103. In one or more embodiments, the users without appropriate decryption keys will view only encrypted information, which will appear to them as meaningless (garbled) strings of data.

In one or more embodiments, only some of the personal information of the first user is encrypted by the dedicated VPN server/proxy 103. To this end, the system may create and store a user profile containing information on the fields (or items of user's personal information) that the to be encrypted by the dedicated VPN server/proxy 103. The information that is not encrypted by the dedicated VPN server/proxy 103, would be accessible or visible by all users.

Figure 2:
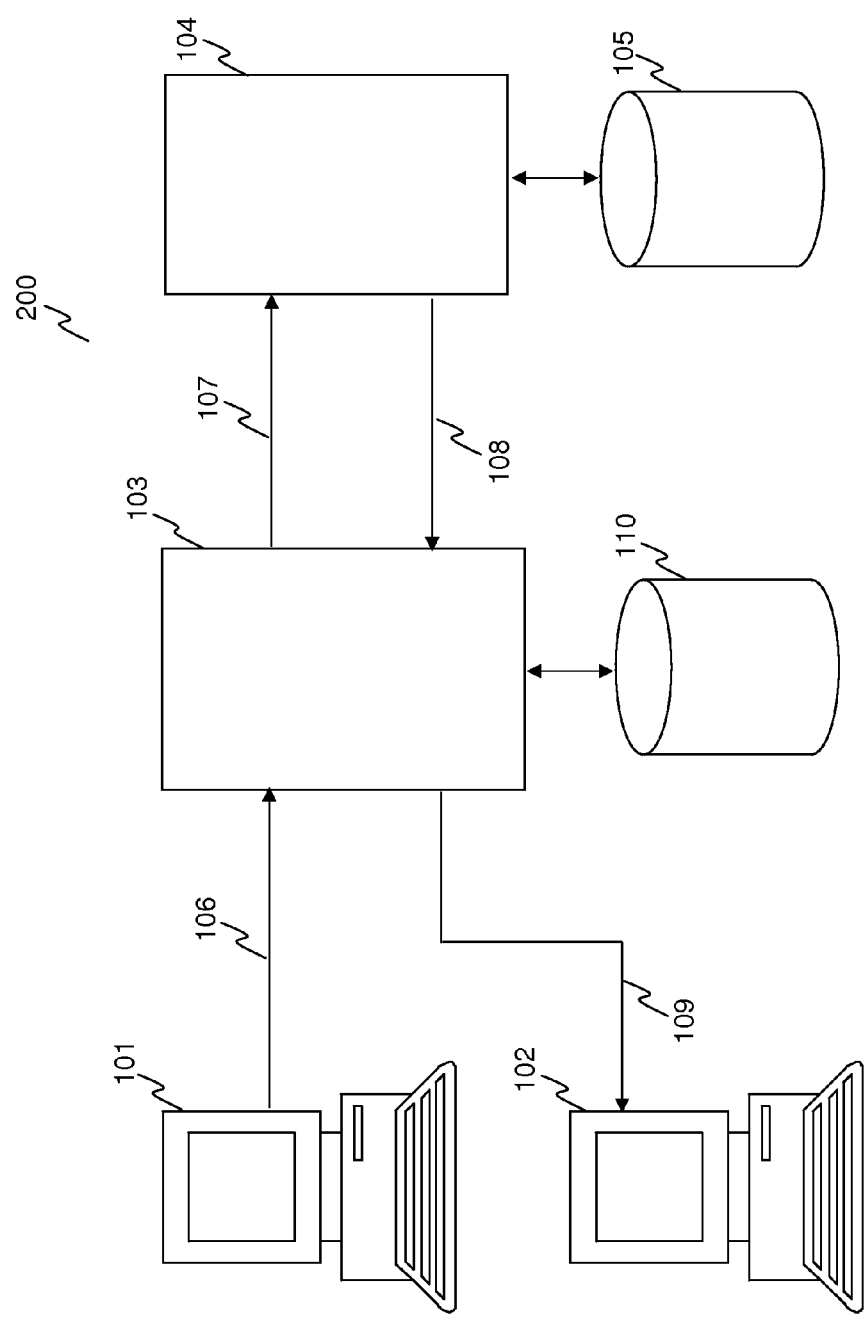
FIG. 2 illustrates another exemplary embodiment of the inventive system for protecting personal information of users of social networking services.

FIG. 2 illustrates another exemplary embodiment of the inventive system for protecting personal information of users of social networking services. The embodiment shown in FIG. 2 incorporates a key store 110, which is configured to store encryption keys for the users of the inventive system. The key store 110 stores encryption keys associated with specific user accounts. A user interface generated by the dedicated VPN server/proxy 103 enables the user owner of the personal information to select other users that are to receive access to that personal information. Based on that selection, the corresponding encryption key(s) are shared using the key store 110. In one or more embodiments, the key store 110 may be implemented as a database or a file. However, as would be appreciated by persons of skill in the art, the present invention is not limited to any specific implementation of the key store 110.

Figure 3:
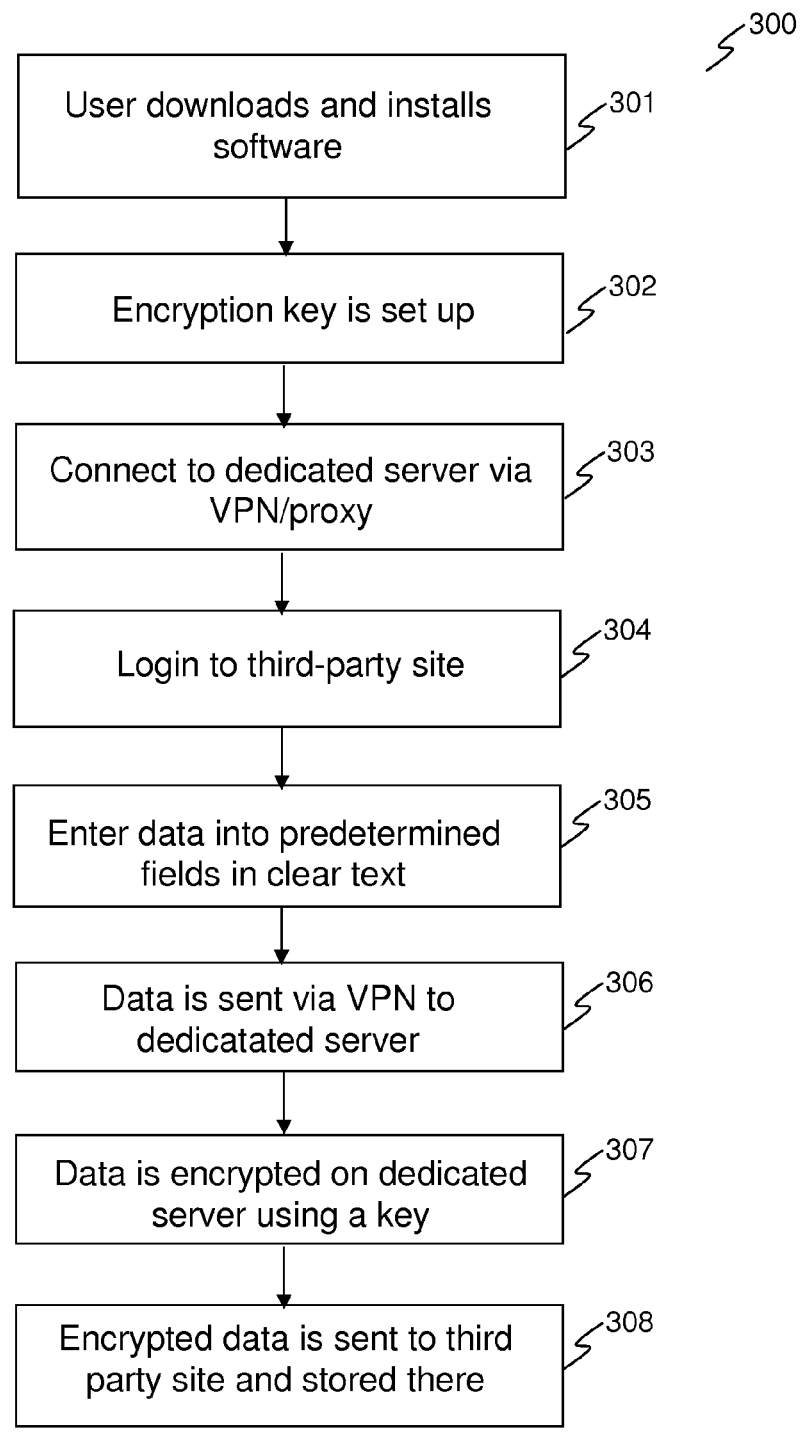
FIG. 3 illustrates an exemplary operating sequence of an exemplary embodiment of the inventive system for protecting personal information of users of social networking services.

FIG. 3 illustrates an exemplary operating sequence of an exemplary embodiment of the inventive system for protecting personal information of users of social networking services. At step 301, the user of the system downloads and installs the client software described above. At step 302, the user specifies to the system which personal information is to be encrypted and also sets up encryption keys and, optionally, the identity of persons with access to the encrypted information. At step 303, the user establishes a secure VPN network connection with the dedicated VPN server/proxy 103 using the client software installed on user's computing device.

At step 304, the user uses the dedicated VPN server/proxy 103 to login into the third party social networking website or service using the login web user interface associated with the aforesaid social networking website or service. At step 305, the user enters his or her personal data in a clear text format into appropriate fields of the user's profile web user interface associated with the aforesaid social networking website or service. The personal information entered by the user is sent via the VPN secure channel from the user's client computer to the dedicated VPN server/proxy 103. As would be appreciated by those of skill in the art, during the aforesaid data transmission, the personal information of the user is protected from all external access by virtue of the strong encryption used in the VPN data transmission process.

At step 307, some or all of the items of the personal information of the user are encrypted by the dedicated VPN server/proxy 103 using appropriate encryption key(s). Finally, at step 308, encrypted and possibly unencrypted user information is sent by the dedicated VPN server/proxy 103 to the third party social networking site. As would be appreciated by persons of ordinary skill in the art, the items of personal information of the user are protected during the aforesaid transmission by virtue of their encryption by the dedicated VPN server/proxy 103. The encrypted and possibly unencrypted user information is then stored in the data store 105 associated with the social networking service.

Figure 4:
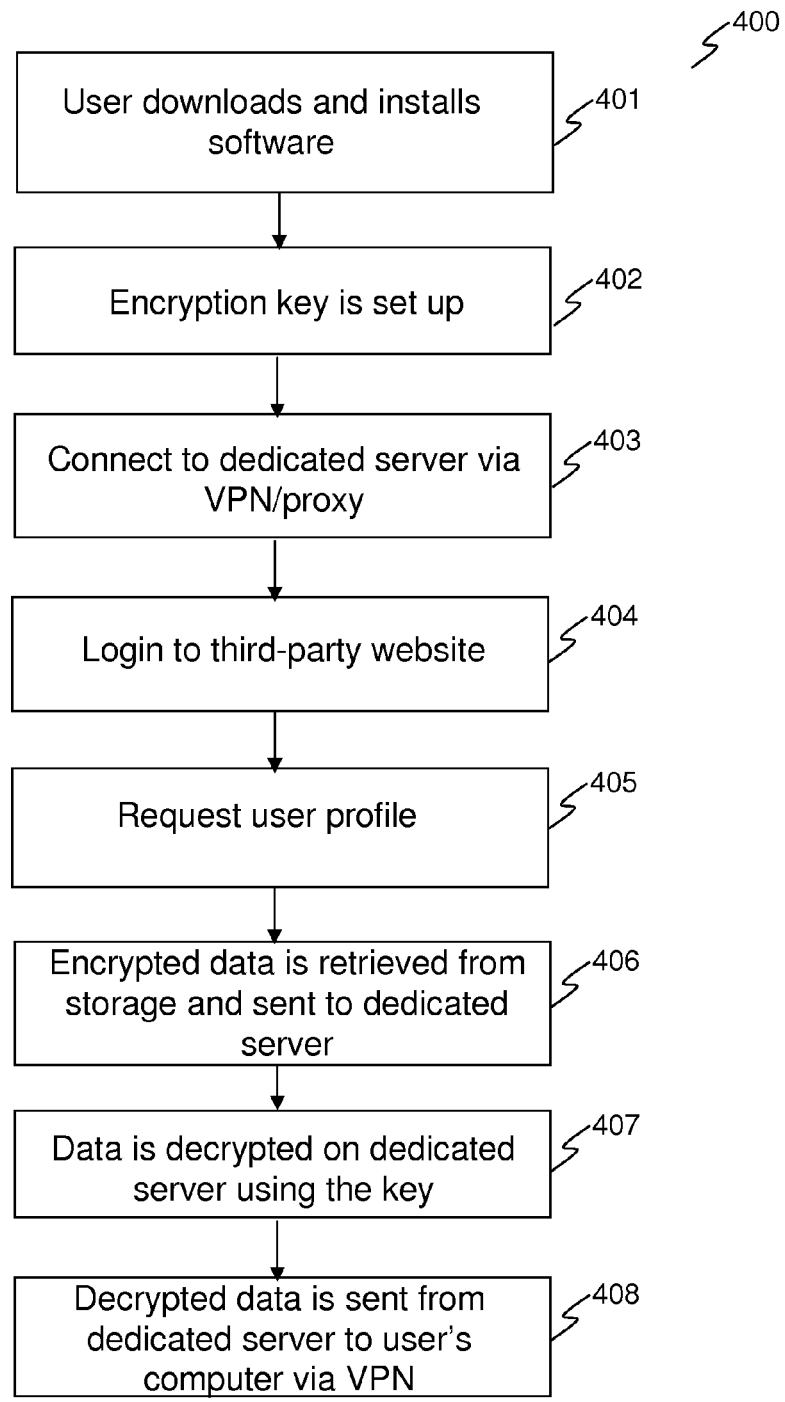
FIG. 4 illustrates an exemplary operating sequence of an exemplary embodiment of the inventive system for retrieving protected personal information of users of social networking services.

FIG. 4 illustrates an exemplary operating sequence of an exemplary embodiment of the inventive system for retrieving protected personal information of users of social networking services. At step 401, the second user of the system downloads and installs the client software. At step 402, the key sharing takes place, whereupon the second user is provided with an appropriate decryption key in accordance with second user's access permissions. At step 403, the user establishes a secure VPN network connection with the dedicated VPN server/proxy 103 using the client software installed on second user's computing device.

At step 404, the second user uses the dedicated VPN server/proxy 103 to login into the third party social networking website or service using the login web user interface associated with the aforesaid social networking website or service. At step 405, the second user requests the personal profile of the first user on the social networking website or service using the web user interface associated with the aforesaid social networking website or service. At step 406, in response to the aforesaid request, the encrypted personal data of the first user is retrieved from the storage 105 and sent to the dedicated VPN server/proxy 103. As would be appreciated by persons of ordinary skill in the art, the items of personal information of the first user are protected during the aforesaid transmission by virtue of their encryption.

At step 407, some or all of the items of the personal information of the first user are decrypted by the dedicated VPN server/proxy 103 using appropriate decryption key(s). Finally, at step 408, the decrypted user information is sent by the dedicated VPN server/proxy 103 to the second user's client computer. As would be appreciated by persons of ordinary skill in the art, the items of personal information of the first user are protected during the aforesaid transmission by virtue of their encryption by the dedicated VPN server/proxy 103. The unencrypted personal information of the first user is then shown to the second user.

As would be appreciated by persons of skill in the art, other configurations and implementations of the inventive system described herein are possible. Specifically, the personal information encryption step may be performed not by the dedicated VPN server/proxy 103, but by the client software installed on user's client computer 101. Conversely, the decryption operation could be performed by the client software installed on the client computer 102. In the same or another embodiment, the dedicated VPN server/proxy 103 may be entirely excluded from the system and the user's personal information could be sent directly between the social networking server 104 and the users' client computers 101 and 102.

It would be also appreciated by those of skill in the art that due to the use of the embodiments of the described system, the social network would not be able to use or sell user's private information because the network does not have access to the decryption keys stored by the dedicated VPN server/proxy 103 or the users' client computers 101 and 102. In addition, advertisements that are doing content analysis of the user's profiles on the server side will not work.

In one or more embodiments, the key sharing is performed in one of the following ways: 1) using a pre-shared key that is the same for all users; or 2) using a new key that is generated for each friend (person with access to personal information of the user) automatically. In the latter case, only user's key and the friend's key have ability to decrypt (access) user's data. It should also be noted that the inventive concepts described herein are not limited to any specific key sharing mechanism and that any now known or later developed encryption/decryption key sharing technique may be utilized in the described systems and methods.

Figure 5:
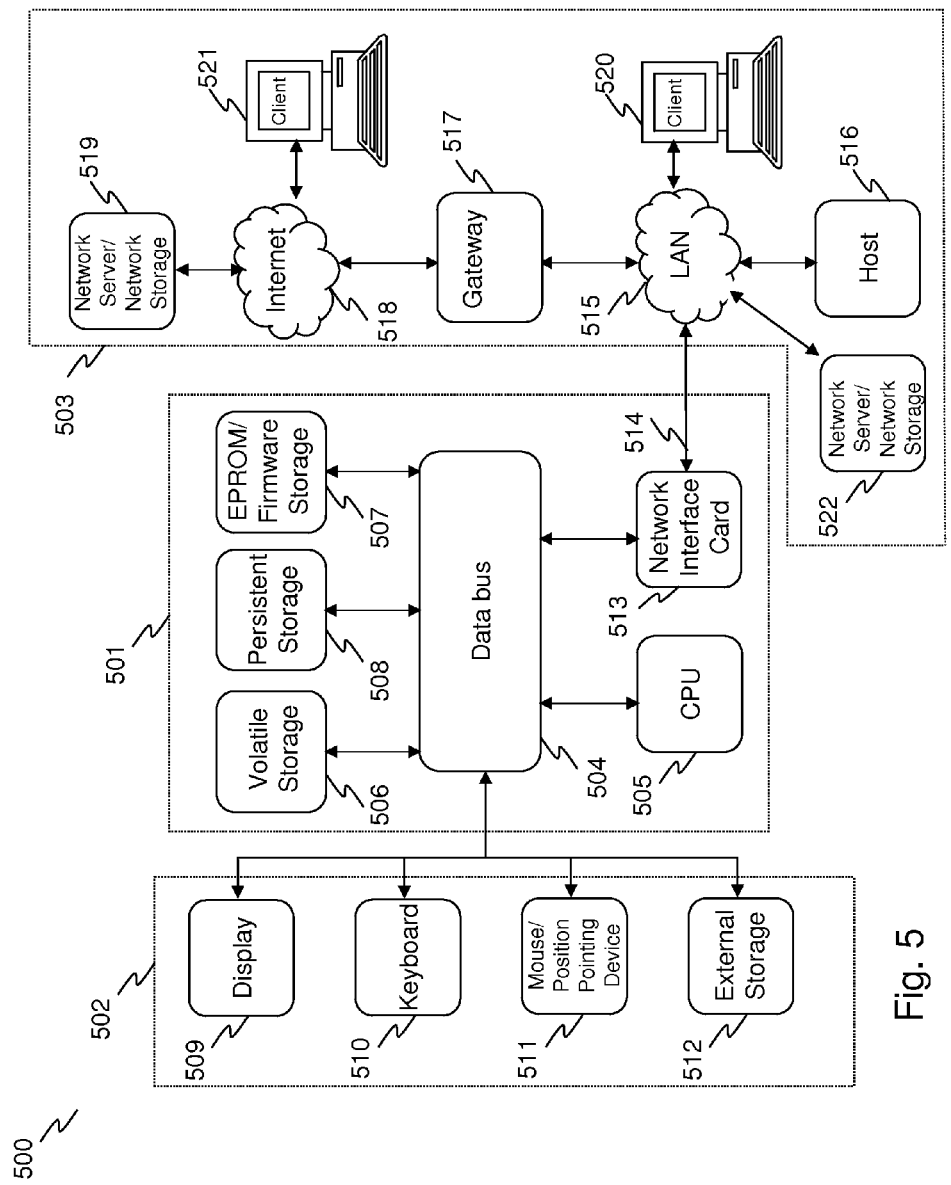
FIG. 5 illustrates an exemplary embodiment of a computer platform upon which the inventive system may be implemented.

FIG. 5 illustrates an exemplary embodiment of a computer platform upon which the inventive system may be implemented. Specifically, FIG. 5 represents a block diagram that illustrates an embodiment of a computer/server system 500 upon which an embodiment of the inventive methodology may be implemented. The system 500 includes a computer/server platform 501, peripheral devices 502 and network resources 503.

The computer platform 501 may include a data bus 505 or other communication mechanism for communicating information across and among various parts of the computer platform 501, and a processor 505 coupled with bus 501 for processing information and performing other computational and control tasks. Computer platform 501 also includes a volatile storage 506, such as a random access memory (RAM) or other dynamic storage device, coupled to bus 505 for storing various information as well as instructions to be executed by processor 505. The volatile storage 506 also may be used for storing temporary variables or other intermediate information during execution of instructions by processor 505. Computer platform 501 may further include a read only memory (ROM or EPROM) 507 or other static storage device coupled to bus 505 for storing static information and instructions for processor 505, such as basic input-output system (BIOS), as well as various system configuration parameters. A persistent storage device 508, such as a magnetic disk, optical disk, or solid-state flash memory device is provided and coupled to bus 501 for storing information and instructions.

Computer platform 501 may be coupled via bus 505 to a display 509, such as a cathode ray tube (CRT), plasma display, or a liquid crystal display (LCD), for displaying information to a system administrator or user of the computer platform 501. An input device 510, including alphanumeric and other keys, is coupled to bus 501 for communicating information and command selections to processor 505. Another type of user input device is cursor control device 511, such as a mouse, a trackball, or cursor direction keys for communicating direction information and command selections to processor 505 and for controlling cursor movement on display 509. This input device typically has two degrees of freedom in two axes, a first axis (e.g., x) and a second axis (e.g., y), that allows the device to specify positions in a plane.

An external storage device 512 may be coupled to the computer platform 501 via bus 505 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 508. Volatile media includes dynamic memory, such as volatile storage 506.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 505. The bus 505 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 505. Communication interface 513 provides a two-way data communication coupling to a network link 515 that is coupled to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 513 typically provides data communication through one or more networks to other network resources. For example, network link 515 may provide a connection through local network 515 to a host computer 516, or a network storage/server 517. Additionally or alternatively, the network link 513 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 515 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 515 and communication interface 513. In the Internet example, when the system 501 acts as a network server, it might transmit a requested code or data for an application program running on client(s) 520 and/or 521 through Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in systems and methods for securing personal information of users on social networks. It is intended that the specification and examples be considered as exemplary only, with a true scope and spirit of the invention being indicated by the following claims.

What is claimed is:

1. A computer-implemented method for securing personal information of a user, the method comprising:
   a. receiving, from the user, personal information, separate and distinct from login credentials of the user, in an unencrypted textual form by a client computer;
   b. transmitting the received personal information, separate and distinct from login credentials of the user, via a secure virtual private network (VPN) connection to a dedicated VPN server/proxy;
   c. receiving the personal information, separate and distinct from login credentials of the user, at the dedicated VPN server/proxy;
   d. encrypting at least a portion of the received personal information, separate and distinct from login credentials of the user, at the dedicated VPN server/proxy using an encryption key;
   e. transmitting the encrypted personal information, separate and distinct from login credentials of the user, from the dedicated VPN server/proxy to a social networking service, wherein the encryption key or a corresponding decryption key are not available to the social networking service;
   f. establishing a VPN secure network connection between a second client computer and the dedicated VPN server/proxy;
   g. receiving, by the second user computer, a request from the second user, for the personal information;
   h. requesting, responsive to the received request, by the dedicated VPN server/proxy, the personal information from the social networking service;
   i. receiving, at the dedicated VPN server/proxy, the personal information from the social networking service;
   j. decrypting, at the dedicated VPN server/proxy, the received personal information; and
   k. transmitting the received personal information via a secure virtual private network (VPN) connection to the second user computer.

2. The computer-implemented method of claim 1, further comprising encrypting the received personal information prior to the transmitting of the received personal information to the dedicated VPN server/proxy.

3. The computer-implemented method of claim 1, wherein the received personal information is decrypted using a decryption key corresponding to the encryption key.

4. The computer-implemented method of claim 3, further comprising sharing the decryption and the encryption key.

5. The computer-implemented method of claim 1, further comprising receiving from a user and storing a specification of the items of the personal information to be encrypted by the dedicated VPN server/proxy before transmission to the social networking service.

6. The computer-implemented method of claim 1, further comprising storing the encryption key in an encryption key repository.

7. A computer-readable medium embodying a set of computer-readable instructions, which, when executed by one or more processors, cause the one or more processors perform a method for securing personal information of a user, the method comprising:
   a. receiving, from the user, personal information, separate and distinct from login credentials of the user, from a user in an unencrypted textual form by a client computer;
   b. transmitting the received personal information, separate and distinct from login credentials of the user, via a secure virtual private network (VPN) connection to a dedicated VPN server/proxy;
   c. receiving the personal information, separate and distinct from login credentials of the user, at the dedicated VPN server/proxy;
   d. encrypting at least a portion of the received personal information, separate and distinct from login credentials of the user, at the dedicated VPN server/proxy using an encryption key; and
   e. transmitting the encrypted personal information, separate and distinct from login credentials of the user, from the dedicated VPN server/proxy to a social networking service, wherein the encryption key or a corresponding decryption key are not available to the social networking service;
   f. establishing a VPN secure network connection between a second client computer and the dedicated VPN server/proxy;
   g. receiving, by the second user computer, a request from the second user, for the personal information;
   h. requesting, responsive to the received request, by the dedicated VPN server/proxy, the personal information from the social networking service;
   i. receiving, at the dedicated VPN server/proxy, the personal information from the social networking service;
   j. decrypting, at the dedicated VPN server/proxy, the received personal information; and
   k. transmitting the received personal information via a secure virtual private network (VPN) connection to the second user computer.

8. The computer-readable medium of claim 7, wherein the method further comprises encrypting the received personal information prior to the transmitting of the received personal information to the dedicated VPN server/proxy.

9. The computer-readable medium of claim 7, wherein the received personal information is decrypted using a decryption key corresponding to the encryption key.

10. The computer-readable medium of claim 9, wherein the method further comprises sharing the decryption and the encryption key.

11. The computer-readable medium of claim 7, wherein the method further comprises receiving from a user and storing a specification of the items of the personal information to be encrypted by the dedicated VPN server/proxy before transmission to the social networking service.

12. The computer-readable medium of claim 7, wherein the method further comprises storing the encryption key in an encryption key repository.

13. A computerized system for securing personal information of a user, the computerized system comprising:
 a. a client computer for receiving, from the user, personal information, separate and distinct from login credentials of the user, from a user in an unencrypted textual form; and
 b. a dedicated VPN server/proxy for receiving personal information, separate and distinct from login credentials of the user, via a secure virtual private network (VPN) connection from the client computer; wherein the dedicated VPN server/proxy encrypts at least a portion of the received personal information, separate and distinct from login credentials of the user, at the using an encryption key and transmits the encrypted personal information, separate and distinct from login credentials of the user, to a social networking service, wherein the encryption key or a corresponding decryption key are not available to the social networking service; and
 c. a second client computer for establishing VPN secure network connection with the dedicated VPN server/proxy and receiving a request from the second user for the personal information, wherein, responsive to the received request, the dedicated VPN server/proxy receives the personal information from the social networking service, decrypts the received personal information; and transmits the received personal information via the VPN secure network connection to the second user computer.

14. The computerized system of claim 13, wherein the client computer encrypts the received personal information prior to the transmitting of the received personal information to the dedicated VPN server/proxy.

15. The computerized system of claim 13, wherein the received personal information is decrypted using a decryption key corresponding to the encryption key.

16. The computerized system of claim 15, wherein the decryption key and the encryption key are shared.

17. The computerized system of claim 13, further comprising an encryption key repository for storing the encryption key.

* * * * *